Sept. 6, 1966 W. W. GARSTANG 3,271,722

ELECTRICAL COMPONENT AND THERMALLY IMPROVED ELECTRICAL INSULATING MEDIUM THEREFOR

Filed Dec. 3, 1963

INVENTOR
WILLIAM W. GARSTANG

BY [signature]

ATTORNEY

United States Patent Office 3,271,722

Patented Sept. 6, 1966

3,271,722

ELECTRICAL COMPONENT AND THERMALLY IMPROVED ELECTRICAL INSULATING MEDIUM THEREFOR

William W. Garstang, Milwaukee, Wis., assignor to Globe-Union Inc., Milwaukee, Wis., a corporation of Delaware Filed Dec. 3, 1963, Ser. No. 327,692
2 Claims. (Cl. 338—306)

Figure 1:
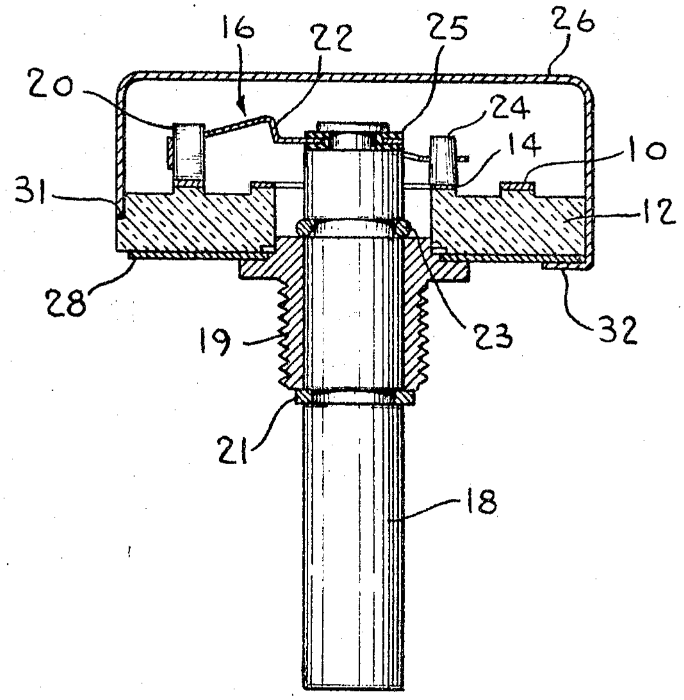

This invention relates to improved electrical components and, more particularly, to an electrical insulating medium having improved thermal characteristics and being particularly well suited for use in various types of electrical components.

This invention is applicable to any type of electrical component which incorporates a solid or fluid insulating medium, such as an electrical insulating base support structure, an encapsulating medium or any other general type of electrical insulating body, and wherein during operation the component is subjected to elevated temperatures, self-generated and/or environmental. However, for convenience this invention will be discussed in connection with, and as embodied in, an electrical resistance device.

Resistors, variable and fixed, are used in many different environments and are often called on to operate at extremely elevated temperatures. The ability of the resistor to dissipate self-generated heat is one of the major factors in determining resistor life, operating characteristics, and load rating. Generally the resistive element, or elements, are relatively small in size and are poor heat sinks and will not exhibit good heat dissipating properties.

It has been discovered that the heat dissipating characteristics of electrical resistors are, to a large degree, dependent upon the heat transfer and dissipating characteristics of their support or substrate structure which are made of suitable electrical insulating material. This invention proposes to improve the thermal characteristics of a resistor by improving its heat dissipating properties through the use of the resistor substrate as a heat transfer medium to receive and transfer heat away from the resistance element and thereby effect a marked improvement in the heat dissipating properties of the resistor unit. Heretofore, resistor substrates have consisted of a body of suitable electrical insulating material containing a suitable filler such as silica, alumina, etc. To improve the heat dissipating characteristics of the substrate, this invention proposes to substitute a filler which exhibits improved heat transfer characteristics while having good electrical insulating properties and being compatible with the particular material of the substrate. The preferred filler is beryllium oxide as it exhibits a thermal conductivity equal to aluminium and approximately ten times as great as that of alumina and does not adversely affect the electrical insulating properties of the substrate. With beryllium oxide dispersed in a substrate of suitable insulating material heat is readily conducted away from the resistance element and dissipated thereby markedly improving resistor life, operating characteristics and load rating.

Accordingly, a general object of this invention is to increase the operating life of an electrical component and to improve its operating characteristics and load rating.

Another, more specific, object of this invention is to provide an electrical insulating medium having optimum heat transfer and dissipating characteristics and being particularly well suited for use in electrical components.

Figure 2:
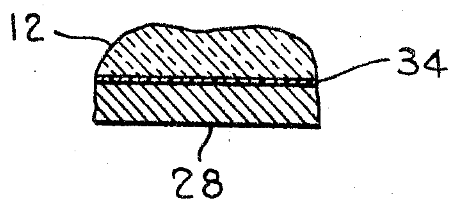

The novel features of this invention are set forth in the appended claims. The invention itself, together with additional objects and advantages thereof, will be more clearly understood from a reading of the following description in connection with the drawings wherein a preferred embodiment of this invention is illustrated and in which:

FIG. 1 is an axial section through the variable resistor device of the type which can incorporate the improved electrical insulating medium of this invention; and FIG. 2 is an enlarged view of a portion of the housing and substrate illustrating a form of heat transfer joint which can be used therebetween.

This invention is illustrated in and will be discussed in connection with a variable resistance device. As illustrated, the variable resistor includes a resistance track 10 supported on a base or substrate structure 12 of electrical insulating material. A common terminal strip 14 is also provided on substrate 12 and a connector brush structure 16 forms an electrical connection between resistance track 10 and terminal strip 14. Brush structure 16 is connected to and rotatable with a control shaft 18 which extends through a mounting bushing 19 and is held for rotation in the bushing by rings 21 and 23. A brush 20, of suitable conductive material, is supported from one end of a connector spring 22 for engagement with resistance track 10 and a second brush 24 is supported from the opposite end of the connector spring for engagement with common terminal 14. In accordance with well-known construction, resistance track 10 is provided with relatively spaced ends (not shown) and these ends, together with common terminal 14, are connected to suitable terminal members (not shown) to provide a 3-wire variable resistance arrangement with the contact arm 16 establishing electrical connection between the resistance track and the common terminal. Shaft 18 can be electrically insulated from connector spring 22 by insulating member 25 which is positioned between the connector spring and the shaft. In assembly, insulating member 25 and connector spring 22 are placed on the shaft end which is then stacked or otherwise suitably deformed to hold member 25 and the connector spring on the shaft. It will be appreciated that the particular structural details of the resistor, its circuit and circuit elements form no part of this invention and that this invention can be incorporated in any resistor, or other electrical component construction as desired.

The resistor is enclosed by a housing comprising a cap 26 and a base plate 28 engaging the underside of substrate 12. The cap is engaged on a shoulder 31 of the substrate and also includes a number of tabs 32 which are spaced around the periphery of the cap and turned under to engage base plate 28. Bushing 19 is suitably connected to the base plate to complete the assmbly of the resistance device.

During resistor operation, heat is generated by the resistance strip, which due to its relatively small cross-sectional area, provides a poor heat sink and is incapable of effectively dissipating this self-generated heat. Without adequate dissipation of heat the operating life and characteristics of the resistor are detrimentally effected and its load rating reduced. As a solution to this problem, this invention proposes to utilize substrate 12 as a heat transfer medium so that heat generated by the resistance element will be effectively transferred from the resistance element for dissipation. In other words, to attribute heat sink characteristics to the substrate so that it can effectively cooperate in dissipating the self-generated heat of the resistance strip. In accordance with present practices, substrate 12 consists of a suitable electrical insulating material, such as suitable organic moldable materials, filled with a suitable material such as silica, alumina or the like and is incapable of effectively transferring heat from the resistance element. This invention proposes to substitute a filler which will improve the heat transfer characteristics of the substrate so that it will adequately transfer heat from the resistance element and do so without materially effecting the electrical insulating properties of the substrate. To this end it is proposed to substitute beryllium oxide as the filler in the substrate. Beryllium oxide has a thermal conductivity equal to aluminium and approximately ten times greater than that of alumina and does not adversely effect the electrical insulating properties of the substrate. With a beryllium oxide filler, the substrate provides an effective heat transfer medium for the resistor and transfers heat from the resistance track for more effective heat dissipation. It will be appreciated that the insulating material of the substrate can be varied as dictated by the particular application, as can the amount of filler used. As an example of prior types of substrates, phenolic resin filled with approximately 78% of a filler has been used. Effective heat sink and heat transfer characteristics can be achieved for most applications using a similar formulation, namely a suitable electrical insulating material containing approximately 78% beryllium oxide as a filler. The main insulating material and percentage of beryllium oxide can be varied as desired and as required for various circuit and environmental conditions.

With a substrate constructed in accordance with this invention, heat is most effectively transferred from the resistance track and dissipated through the resistor housing, primarily base plate 28, and directly from the exposed peripheral portions of the substrate as can be seen in FIG. 1. In order to further optimize heat dissipation it may be desirable, in some applications, to provide a good heat connection at the juncture of substrate 12 and base plate 28. The base plate in assembly is arranged to directly engage the underside of the substrate and, the substrate being a solid body, air gaps may occur between it and the base. These air gaps create a heat insulating barrier, or barriers, tending to hold heat in the substrate. To avoid the formation of these heat insulating gaps and to establish an effective heat transfer connection between the base plate and substrate, it is proposed to provide a medium 34 in the joint between substrate 12 and base plate 28, which medium comprises a silicon oil, or grease, suitably impregnated with quantities of beryllium oxide. The joint has been enlarged for purposes of illustration in FIG. 2. This places a good heat transfer medium in the juncture for optimum conduction of heat from the substrate to the base plate from which it is most effectively dissipated. With the beryllium oxide impregnated silicon grease disposed between it and the substrate, the base plate becomes a more integral part of the substrate from a heat transfer standpoint.

This invention provides an electrical insulating medium which, in addition to exhibiting good electrical insulating properties, also exhibits optimum heat transfer properties and, it will be appreciated that the medium can be solid or fluid as required by the particular application and has general utility in electrical components where an electrical insulating medium is required having good heat transfer characteristics. The insulating medium exhibits these improved characteristics and, furthermore, when incorporated in an electrical component results in an improved component wherein the electrical insulating medium, be it a supporting substrate or encapsulating medium, acts as a heat transfer medium to thereby provide optimum heat transfer and dissipation.

Although but one embodiment of the present invention has been illustrated and described, it will be apparent to those skilled in the art that various changes and modifications may be made therein without departing from the spirit of the invention or from the scope of the appended claims.

What I claim is:

1. An electrical circuit component comprising, in combination,
a substrate of electrical insulating material,
a current carrying circuit element subject to self-generation of heat upon the passage of electrical current therethrough,
said current carrying circuit element supported on said substrate and in direct heat transfer engagement therewith and said substrate effective to draw said self-generated heat from said current carrying circuit element so that said substrate functions as a heat sink for said current carrying circuit element to dissipate said self-generated heat,
said substrate characterized by having a quantity of beryllium oxide dispersed therein as a filler to enhance the heat transfer properties thereof,
a housing including a portion extending coextensively with and adjacent a portion of said substrate,
and means comprising a quantity of beryllium oxide dispersed in a fluid carrier disposed substantially throughout the juncture between said substrate and housing portions to complete a heat transfer connection between said substrate and housing portions.

2. An electrical resistor comprising, in combination,
a substrate of electrical insulating material,
a resistance element subject to self-generation of heat upon the passage of electric current therethrough,
said resistance element supported on said substrate and in direct heat transfer engagement therewith and said substrate drawing said self-generated heat from said resistance element so that said substrate functions as a heat sink for said resistance element to dissipate said self-generated heat,
said substrate characterized by having a quantity of beryllium oxide dispersed therein as a filler to enhance the heat transfer properties thereof,
a housing including a portion extending coextensively with and adjacent to a portion of said substrate,
and means comprising a quantity of beryllium oxide dispersed in a fluid carrier disposed substantially throughout the juncture between said substrate and housing portions to complete a heat transfer connection between said substrate and housing portions.

References Cited by the Examiner

UNITED STATES PATENTS

| | | | |
|---|---|---|---|
| 2,863,974 | 12/1958 | Zabel et al. | 338—51 |
| 2,887,628 | 5/1959 | Zierdt | 317—234 |
| 3,025,437 | 3/1962 | Van Namen et al. | 317—235 |
| 3,136,878 | 6/1964 | Staller | 219—239 |
| 3,187,226 | 6/1965 | Kates | 317—100 |

FOREIGN PATENTS

| | | |
|---|---|---|
| 659,585 | 3/1963 | Canada. |
| 932,999 | 7/1963 | Great Britain. |

RICHARD M. WOOD, *Primary Examiner.*

ANTHONY BARTIS, *Examiner.*

V. Y. MAYEWSKY, *Assistant Examiner.*